(12) United States Patent  
Van Laere et al.

(10) Patent No.: US 7,643,709 B2  
(45) Date of Patent: Jan. 5, 2010

(54) SLANTED SEGMENTED COUPLER

(75) Inventors: Frederik Van Laere, Lochristi (BE); Roeland Baets, Deinze (BE); Dries Van Thourhout, Ghent (BE); Dirk Taillaert, Bredene (BE)

(73) Assignees: Interuniversitair Microelektronica Centrum (IMEC), Leuven (BE); Universiteit Gent, Gent (BE)

( * ) Notice: Subject to any disclaimer, the term of this patent is extended or adjusted under 35 U.S.C. 154(b) by 0 days.

(21) Appl. No.: 11/745,851

(22) Filed: May 8, 2007

(65) Prior Publication Data

US 2007/0263973 A1    Nov. 15, 2007

Related U.S. Application Data

(60) Provisional application No. 60/800,244, filed on May 12, 2006.

(51) Int. Cl.  
*G02B 6/34* (2006.01)
(52) U.S. Cl. .......................................... 385/37; 385/129
(58) Field of Classification Search .................... 385/37, 385/129–132; 359/15, 17, 18, 558, 566, 359/573; 369/103  
See application file for complete search history.

(56) References Cited

U.S. PATENT DOCUMENTS

| | | | | | |
|---|---|---|---|---|---|
| 4,672,187 | A | * | 6/1987 | Fujita et al. | 250/201.5 |
| 4,740,951 | A | * | 4/1988 | Lizet et al. | 398/87 |
| 5,044,718 | A | * | 9/1991 | Kando | 385/4 |
| 5,116,461 | A | * | 5/1992 | Lebby et al. | 216/2 |
| 5,285,274 | A | * | 2/1994 | Tanno et al. | 385/129 |
| 5,657,407 | A | * | 8/1997 | Li et al. | 385/37 |

(Continued)

FOREIGN PATENT DOCUMENTS

JP    2005173116    6/2005

OTHER PUBLICATIONS

Bin Wang et al., "Embedded Slanted Grating for Vertical Coupling Between Fibers and Silicon-On-Insulator Planar Waveguides," IEEE Photonics Technology Letters, vol. 17, No. 9, Sep. 2005.

(Continued)

*Primary Examiner*—Ellen Kim  
(74) *Attorney, Agent, or Firm*—McDonnell Boehnen Hulbert & Berghoff LLP (57) ABSTRACT

A slanted grating coupler for coupling a radiation beam between a waveguide lying substantially in a plane on a substrate and an optical element outside that plane is provided, whereby the slanted grating coupler has a good coupling efficiency for medium or low index contrast material systems. Furthermore, a method for manufacturing the slanted grating coupler is provided. The slanted grating coupler comprises a plurality of slanted slots extending through the waveguide core and being arranged successively in the propagation direction of the waveguide. In at least part of the coupling region, the size of the slanted slots in a lateral direction, being a direction within the waveguide plane and perpendicular to the propagation direction of the waveguide, is smaller than the lateral size of the waveguide core. Successive slots are displaced with respect to each other in the lateral direction. Radiation incident from the waveguide on a slanted slot of the slanted segmented coupler is partly reflected upwards at the interface with air. Part of the radiation is transmitted in between or around the slots and propagates further, until it reaches another slot.

22 Claims, 8 Drawing Sheets

U.S. PATENT DOCUMENTS

| | | | | |
|---|---|---|---|---|
| 6,167,169 A | * | 12/2000 | Brinkman et al. | 385/4 |
| 6,259,841 B1 | * | 7/2001 | Bhagavatula | 385/47 |
| 6,650,799 B2 | * | 11/2003 | Lyons | 385/12 |
| 6,748,138 B2 | * | 6/2004 | Wang et al. | 385/37 |
| 6,842,566 B2 | * | 1/2005 | Ishikawa et al. | 385/37 |
| 6,895,136 B2 | * | 5/2005 | Deliwala | 385/14 |
| 7,164,532 B2 | * | 1/2007 | Funato et al. | 359/569 |
| 7,184,625 B2 | | 2/2007 | Gunn, III et al. | 385/37 |
| 2004/0156590 A1 | | 8/2004 | Gunn, III et al. | |

OTHER PUBLICATIONS

F. Van Laere et al., "Compact Slanted Granting Couplers Between Optical Fiber and InP-InGaAsP Waveguides," IEEE Photonics Technology Letters, vol. 19, No. 6, Mar. 15, 2007.

B. Wang et al., "Compact Slanted Grating Couplers," Optics Express, vol. 12, No. 15, pp. 3313-3326, Jul. 26, 2004.

European Search Report 07107996.6 dated Aug. 13, 2007.

* cited by examiner

SLANTED SEGMENTED COUPLER

RELATED APPLICATIONS

The present patent application claims priority under 35 U.S.C. § 119(e) to U.S. Provisional Patent Application Ser. No. 60/800,244, which was filed May 12, 2006. The full disclosure of U.S. Provisional Patent Application Ser. No. 60/800,244 is incorporated herein by reference.

FIELD

The present invention is related to the field of integrated optics, more particularly, to the field of optical waveguide couplers or gratings and to a method for manufacturing optical waveguide couplers or gratings.

BACKGROUND

Photonic integrated circuits hold the potential of creating low cost, compact, optical functions. The application fields in which they can be applied are very diverse: telecommunication and data communication applications, sensing, signal processing, and so on. These optical circuits comprise different optical elements, such as light sources, optical modulators, spatial switches, optical filters, photodetectors, etc., with the optical elements being interconnected by optical waveguides.

Optical waveguides are typically implemented as solid dielectric light conductors, which allow routing of light over the integrated optical circuit and to interconnect the various optical components integrated on the circuit. The optical waveguides also provide the interfacing between the optical fiber and the optical circuit, typically by physical abutment of the optical fiber to the waveguide. Due to the large difference in mode size between the optical fiber and the integrated optical waveguide, this typically leads to high coupling losses at the coupling interface.

Several solutions have been proposed for improving the coupling efficiency between an optical fiber and the optical waveguide circuit. In a first approach, the optical mode of the single mode optical fiber is transformed to a smaller spot-size by using a lensed optical fiber or a high numerical aperture fiber. Another approach is to use an integrated spot-size converter to expand the size of the integrated optical waveguide mode to match that of a single mode optical fiber.

As an alternative approach, vertically etched diffraction grating structures have been proposed. These structures allow direct physical abutment from the top or bottom side of an optical waveguide circuit with a standard single mode optical fiber, while the diffraction grating directs the light from the optical fiber into the optical waveguide circuit or from the optical waveguide into the optical fiber. However, when traditional gratings with a small coupling strength are used, long gratings are needed and the outcoupled beam is much larger than the fiber mode. As a result, an additional lens is needed to couple to a fiber or alternatively a curved grating can be used that focuses the light into a fiber. Another possibility is using strong index modulated gratings working in the strong coupling regime. Compact and efficient grating couplers with a rectangular tooth profile have been demonstrated in high index contrast material systems (e.g., SOI). For low-index contrast material systems (such as e.g. InP/InGaAsP heterostructures), it is not possible to design such a compact and efficient grating coupler.

However, e.g., for telecommunication applications, the material of interest is InP, allowing active functionality. InP heterostructures or InP/InGaAsP heterostructures can be easily integrated with active components, such as for example lasers or modulators. Typically, the index contrast for these material systems is modest and too low to make compact grating couplers. Only very long (typically hundreds of micrometers) and narrowband gratings have been demonstrated for such material systems.

To improve the coupling efficiency, slanted waveguide couplers or gratings have been proposed, for example as described in U.S. Pat. No. 5,657,407. In this approach, a grating coupler is provided with a row of parallelogramic teeth, whereby the side walls of the teeth form an angle different from 90 degrees with the plane of the waveguide corresponding to the guided wave propagation direction. The width to period ratio of the grating teeth may be variable along the guided wave propagation direction to shape the grating output beam profile. When using such slanted gratings, the radiation directionality and the radiation factor can be increased, resulting in an improved coupling efficiency. Gratings with a parallellogramic teeth profile can suppress second order reflection and show high radiation factors. Directionality of 90% was demonstrated in a low index-contrast material system, using parallellogramic gratings made by a modified RIE-process. However, the grating was 3 mm long. Moreover, for this type of grating, there are significant fabrication challenges due to the small periods and the steep slant angles required.

In "Compact slanted grating couplers," Optics Express, Vol. 12, No. 15, 3313, July 2004, B. Wang et al. present a compact and efficient design for slanted grating couplers for coupling to polymeric waveguides, making use of a strong index modulated slanted grating. In this approach, the grating is etched in the cladding and filled with a higher index material. For a 20 μm long grating an input coupling efficiency of 80% is calculated, but experimental results are not reported.

In "Embedded slanted grating for vertical coupling between fibers and Silicon-on-Insulator planar waveguides," IEEE Photonics Technology Letters, Vol. 17, No. 9, 1884, September 2005, Bin Wang et al. propose a slanted grating coupler in which the slanted grating is completely embedded in the waveguide core, with an overlying upper cladding that fills the grating grooves. Simulations show that up to 75.8% coupling efficiency can be obtained between a single-mode fiber and a 240 nm thick Silicon-on-Insulator planar waveguide. Experimental results are not shown. A typical groove size in the propagation direction is about 200 nm, which may be difficult to control during fabrication, and which may be difficult to fill with the cladding material.

In "Compact slanted grating couplers between optical fiber and InP-InGaAsP waveguides," IEEE Photonics Technology Letters, Vol. 19, No. 6, 2007, F. Van Laere et al. describe a compact (10 μm long) slanted grating coupler for coupling between a single mode fiber and low-index-contrast InP-based waveguides (InGaAsP core and InP cladding). In a waveguide, narrow air slots are etched at an angle of 45 degrees with respect to the plane of the waveguide, completely through the core of the waveguide. Part of the light incident from the waveguide on the slots is reflected upwards at the interface with air. If the slots are sufficiently narrow, part of the light can tunnel through the slot and reach a second slot, where it is again partly reflected and partly transmitted. In this way, the waveguide mode is coupled out vertically in a distributed way, thereby matching the mode of a fiber positioned vertically above the grating.

An important design parameter for this type of grating couplers is the width (i.e., the size in the light propagation direction) of the air slots. When the slots are too wide, there is little transmission and almost all the light is coupled out by the first slot, resulting in a poor overlap with the fiber mode. When the slots are too narrow, most of the light tunnels through the slot and little light is reflected upwards. In a typical design, very narrow slots are required (narrower than 100 nm), and it is difficult to etch these slots sufficiently deep, the required depth being 1 μm or more. A compact grating coupler is obtained, but the coupling efficiency is relatively low. For a 10 μm long slanted grating the maximum calculated coupling efficiency is 59%, whereas an experimental coupling efficiency to fiber of 16% is reported for a non-optimized design.

In U.S. Pat. No. 7,184,625, a flared optical waveguide grating coupler is described for use in a high index contrast material system, the coupler comprising elongate scattering elements. In some embodiments, where features are required with dimensions smaller than the lithographic limit, e.g., for realizing a small scatter cross section, these elongate scattering elements are segmented. The segmented scattering elements are arranged over the waveguide core and their sidewalls are substantially perpendicular to the waveguide plane.

SUMMARY

The characteristics, features, and advantages of the invention will be clarified in the detailed description in combination with the drawings, which illustrate the principles of the invention. The description is given as an example only, without limiting the scope of the invention.

It is an aim of the present invention to provide a compact slanted grating coupler for coupling a radiation beam between a waveguide core and an optical element, whereby the grating coupler has a good coupling efficiency for medium or low index contrast material systems and whereby the fabrication conditions are relaxed as compared to prior art slanted grating couplers. It is another aim of the present invention to provide a method for manufacturing the coupler.

This aim is achieved by providing in a coupling region a slanted grating coupler comprising a plurality of slanted slots extending completely through the waveguide core, the slots being arranged successively in a propagation direction of the waveguide for coupling the radiation beam in a distributed way, whereby in at least part of the coupling region the lateral size of the slots is smaller than the lateral size of the coupling region and whereby successive slots are displaced with respect to each other in the lateral direction. In the context of this invention, the lateral direction is a direction in the waveguide plane and perpendicular to the propagation direction of the waveguide.

Extension of the slots completely through the core of the waveguide allows capturing the entire waveguide mode and reflecting it upwards, such that a compact grating coupler may be obtained with a good coupling efficiency. The approach according to the present invention does not require an accurate control of the depth of the slanted slots, as long as the slots are sufficiently deep, i.e., as long as the slots extend completely through the core of the waveguide. Moreover, as the lateral size of the slots is smaller than the lateral size of the waveguide core in at least part of the coupling region, the need for forming very narrow slots, as required in prior art slanted couplers, can be avoided.

In embodiments of the present invention, radiation incident from the waveguide on a slanted slot of the slanted segmented coupler is partly reflected upwards at the interface with air. Part of the radiation is transmitted in between or around the slots and propagates further, until it reaches another slot. As opposed to prior art slanted couplers, where very narrow (e.g., less than 100 nm wide) slots are required to allow tunneling of radiation through the slots, in embodiments of the present invention part of the radiation is transmitted in between the slots, such that the need for tunneling through the slots can be avoided. Therefore, in embodiments according to the present invention, the slots may be wider (i.e., larger in the propagation direction of the waveguide) than in prior art solutions, giving rise to relaxed fabrication conditions.

According to the present invention, a slanted grating coupler for coupling in a coupling region a radiation beam between a core of a waveguide lying substantially in a plane on a substrate and an optical element outside that plane, comprises in the coupling region a plurality of slanted slots that extend fully through the core and have sidewalls forming a first predefined angle with the waveguide plane. At least part of the plurality of slanted slots is arranged successively in a propagation direction of the waveguide for coupling the radiation beam in a distributed way. A slanted grating coupler according to the present invention is characterized in that in at least part of the coupling region the size of the slots in a lateral direction, being a direction within the waveguide plane and perpendicular to the propagation direction of the waveguide, is smaller than the size of the waveguide core in the lateral direction and in that successive slots are displaced with respect to each other in the lateral direction.

The plurality of slanted slots may have predetermined locations, sizes and shapes for substantially matching the intensity profile of a radiation beam propagating in the waveguide to the fiber mode of an optical fiber to which the radiation beam is coupled by the grating coupler. The plurality of slanted slots may have predetermined locations, sizes, and shapes for imposing a Gaussian-like intensity profile on a radiation beam coupled by the grating coupler from the waveguide to the optical element.

The waveguide may for example be a slab waveguide, a strip loaded waveguide, a channel waveguide, or a ridge waveguide.

The cross-sectional shape of the plurality of slanted slots in a plane parallel to the waveguide plane may for example be narrow lines, rectangles, squares, triangles, circles, or ovals. The slanted slots may for example be arranged on essentially parallel lines substantially perpendicular to the propagation direction of the waveguide or they may be arranged on curved lines with a common focal point. The lateral displacement of the slanted slots may be such that the slanted slots on one line are alternating with the slanted slots on the neighboring lines.

In embodiments according to the present invention, the first predefined angle may be for example between 30 and 60 degrees, e.g., about 45 degrees.

The present invention is furthermore related to a method for manufacturing in a coupling region a slanted grating coupler for coupling a radiation beam between a core of a waveguide lying substantially in a plane on a substrate and an optical element. The method comprises etching in the coupling region a plurality of slanted slots that extend fully through the core of the waveguide, have sidewalls forming a first predefined angle with the waveguide plane and are at least partially arranged successively in a propagation direction of the waveguide for coupling the radiation beam in a distributed way. The method according to embodiments of the present invention is characterized in that in at least part of the coupling region the size of the slots in a lateral direction, being a direction within the waveguide plane and perpendicular to the propagation direction of the waveguide, is smaller than the size of the waveguide core in the lateral direction and in that successive slots are displaced with respect to each other in the lateral direction.

The method according to embodiments of the present invention may further comprise: depositing a hardmask on the substrate comprising the waveguide; providing a resist layer on the hardmask; defining in the resist layer a pattern comprising a plurality of openings, the plurality of openings being located in the coupling region, at least part of the plurality of openings being arranged successively in the propagation direction of the waveguide, whereby in at least part of the coupling region the size of the openings in the lateral direction is smaller than the size of the waveguide core in the lateral direction and whereby successive openings are displaced with respect to each other in the lateral direction; removing the hardmask where the openings are located, thereby using the resist layer as a mask; removing the resist layer; and after etching the plurality of slanted slots, removing the hardmask.

In embodiments according to the present invention, the dimensions of the openings and the thickness of the hardmask may be selected such that after etching the plurality of slanted slots through the core of the waveguide, at least part of the hardmask remains in between the openings. The slanted slots may be wider than 250 nm, preferably wider than 300 nm, in the propagation direction of the waveguide.

The shape of the openings may for example be narrow lines, rectangles, squares, triangles, circles, or ovals.

The slanted slots may be arranged on essentially parallel lines perpendicular to the propagation direction of the waveguide or they may be arranged on curved lines with a common focal point. The lateral displacement of the slanted slots may be such that the slots on one line are alternating with the slots on the neighboring lines.

In embodiments according to the present invention, the first predefined angle may for example be between 30 and 60 degrees, e.g., about 45 degrees.

Etching the hardmask may be performed at an angle of 90 degrees with respect to the waveguide plane or at an angle substantially different from 90 degrees, for example at a second predefined angle with respect to the waveguide plane, the second predefined angle being for example in the range between 30 and 60 degrees, e.g., about 45 degrees.

In embodiments according to the present invention, the slanted segmented coupler may be implemented in a low index contrast material system, for example an InP/InGaAsP heterostructure wherein the waveguide may comprise for example an InGaAsP core and an InP cladding on an InP substrate.

The subject matter regarded as invention is particularly pointed out and distinctively claimed in the claim section of this document. The invention however, both as to organization and method of operation, together with features and advantages thereof, may best be understood by reference to the following detailed description when read with the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third, and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under, and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising," used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

In the context of this invention, the terms "radiation" and "light" are used for indicating electromagnetic radiation with a wavelength in a suitable range, i.e., electromagnetic radiation with a wavelength that is not absorbed by the materials used (e.g., the waveguide material), for example electromagnetic radiation with a wavelength between 1 μm and 2 μm.

In the present invention, compact slanted grating couplers with a good coupling efficiency, e.g., when used with low index contrast material systems are provided. Furthermore, a method for manufacturing such couplers is presented, the method having relaxed fabrication conditions as compared to prior art methods.

Figure 1:
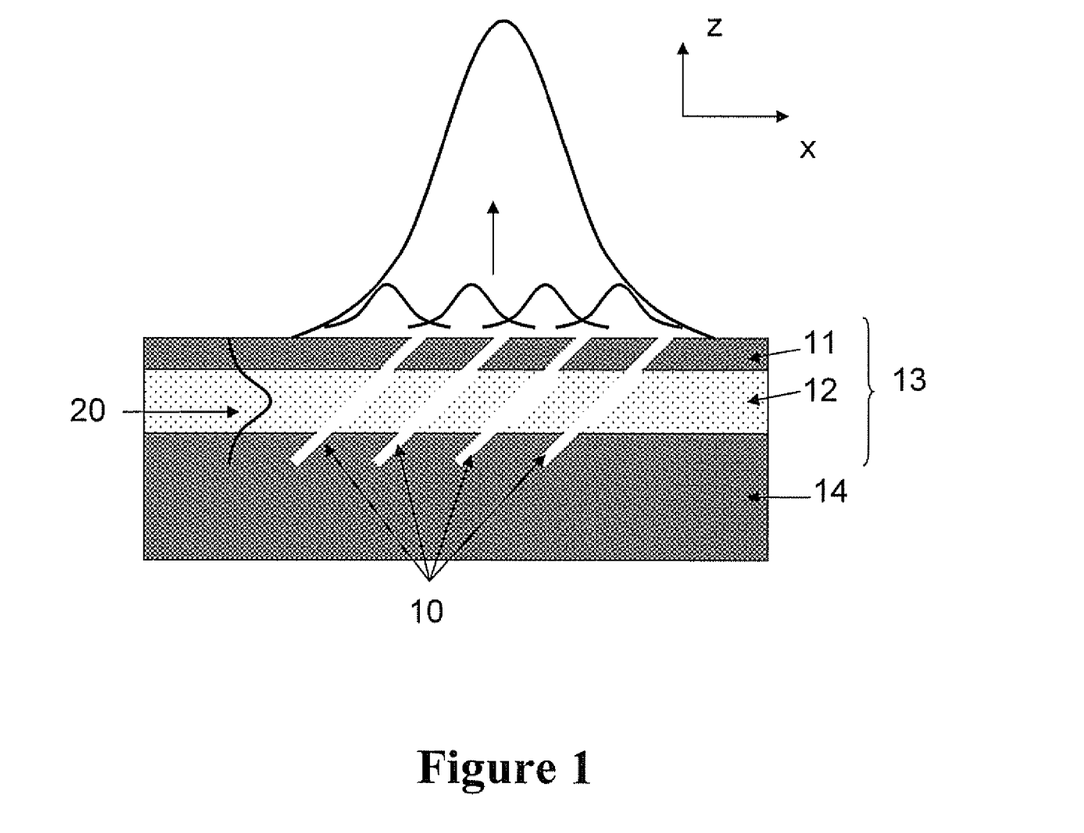
FIG. 1 illustrates the principles of a slanted grating coupler.
Figure 2:
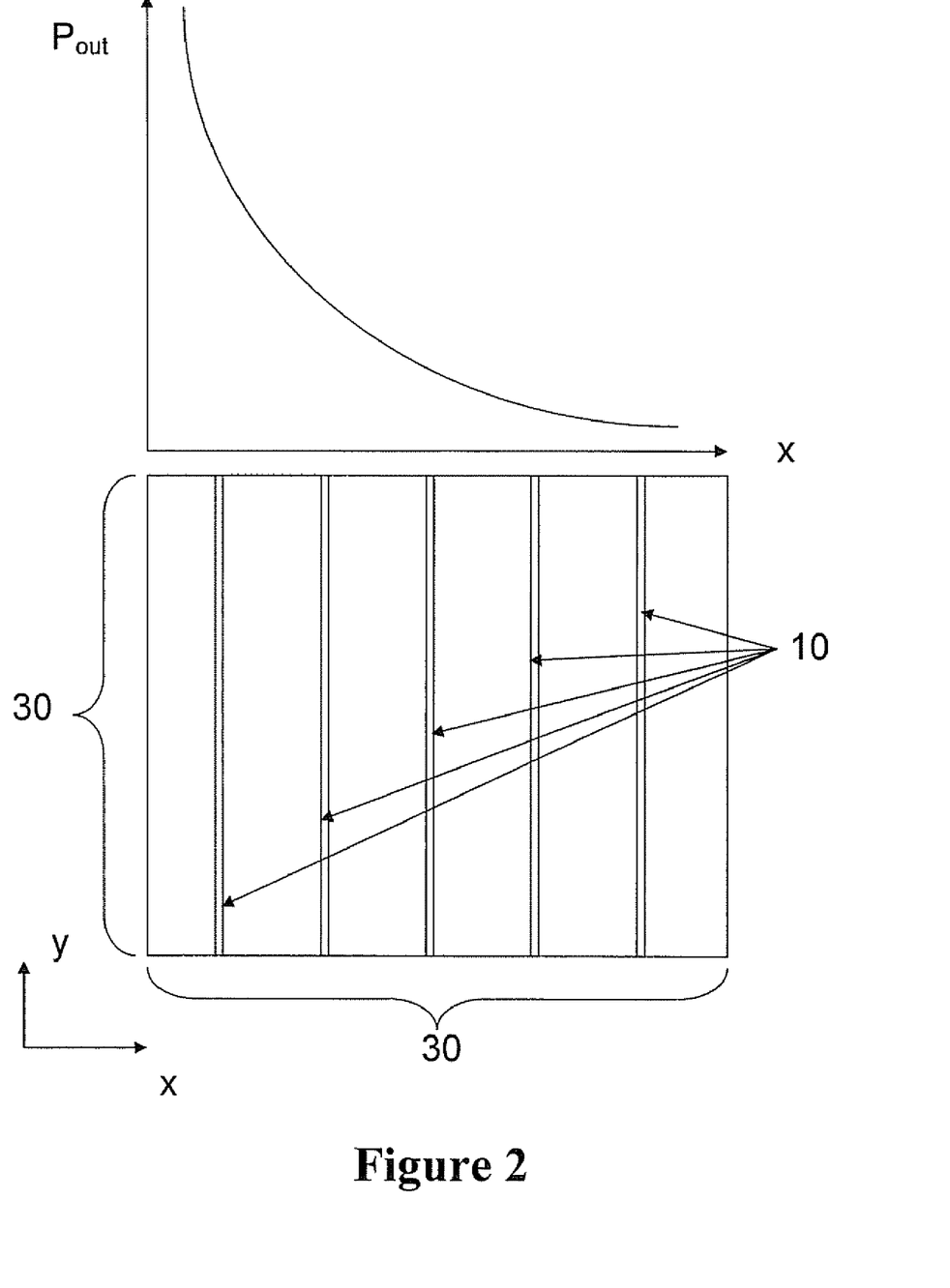
FIG. 2 shows a top view of a slanted (not segmented) coupler with air slots according to prior art solutions. Slots are extending over the full lateral width of the coupling region and have to be very narrow. In the example shown, the intensity profile of the outcoupled radiation beam Pout is exponentially decaying in the propagation direction x.
Figure 3:
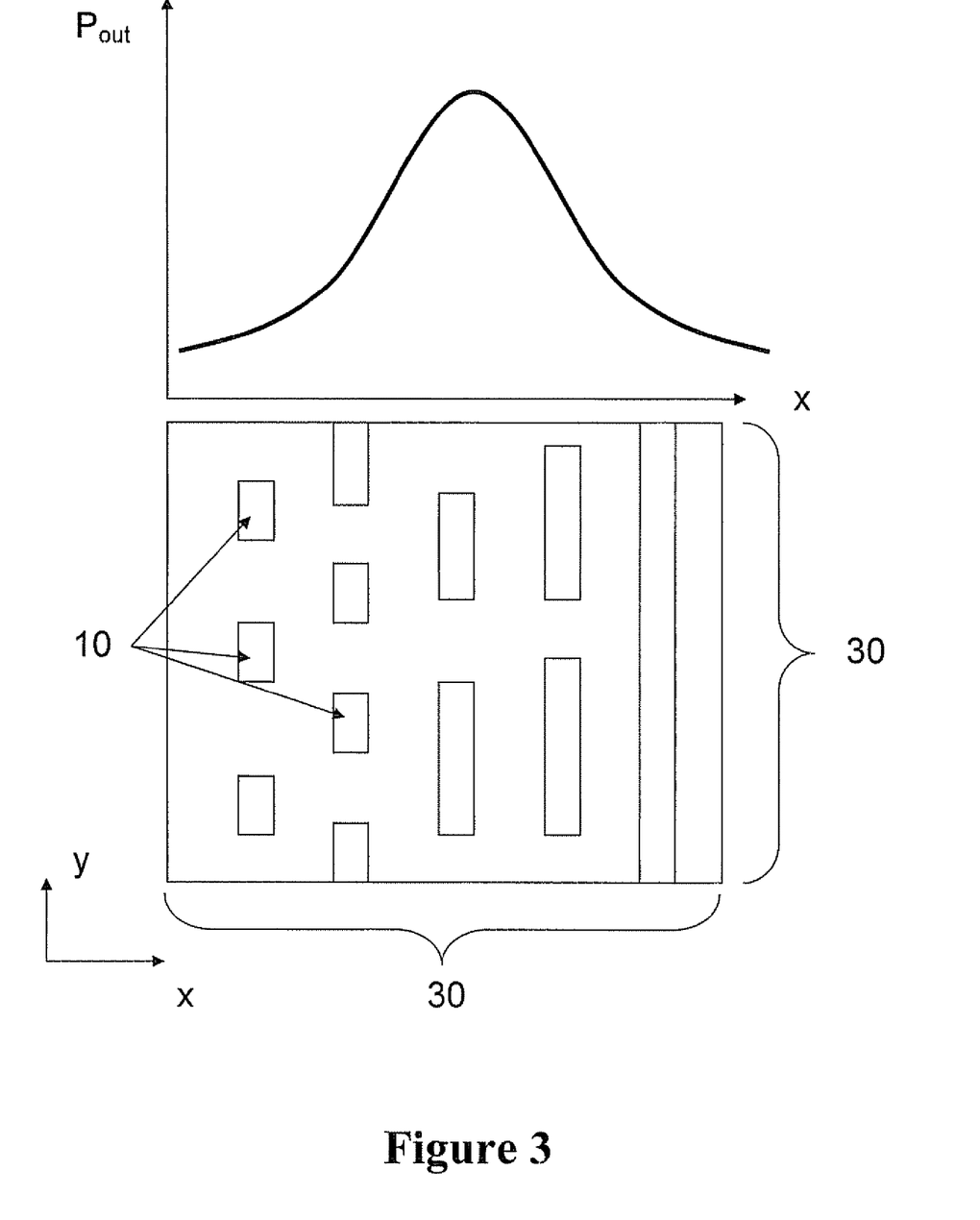
FIG. 3 represents a top view of a slanted segmented coupler according to embodiments of the present invention. The position and the size of the slots can be chosen so as to achieve an outcoupled radiation beam with a Gaussian intensity profile, which matches the fiber mode of a fiber coupled to the coupler. The slots can vary in width, length, and shape, and can be formed at a predefined angle with respect to the waveguide plane, as deep as possible.

A slanted segmented grating coupler according to embodiments of the present invention comprises in a coupling region 30, a plurality of slanted slots 10 extending completely through the upper cladding 11, and the core 12 of a waveguide 13 substantially lying in a plane on a substrate 14, as shown in FIG. 1, whereby in at least part of the coupling region 30, the size of the slanted slots 10 in the lateral direction y is smaller than the size of the core 12 in the lateral direction y, as shown in FIG. 3. In the context of this invention, the lateral direction y is a direction in the plane of the waveguide perpendicular to the propagation direction x of the waveguide, as illustrated in FIG. 3.

The sidewalls of the slanted slots 10 form a first predefined angle with respect to the waveguide plane. At least part of the slanted slots 10 is arranged successively in the propagation direction x of the waveguide, e.g., for coupling a radiation beam 20 in a distributed way, and successive slots 10 are displaced with respect to each other in the lateral direction y. Extension of the slots 10 completely through the core 12 of the waveguide 13 allows capturing the entire waveguide mode and reflecting it upwards. It is furthermore an advantage of the approach according to the present invention that an accurate control of the depth (i.e., the size in a direction perpendicular to the waveguide plane) of the slanted segmented slots 10 is not required, so long as the slots are sufficiently deep, i.e., so long as the slots 10 extend through the upper cladding 11 and though the core 12, into the substrate 14.

By making the lateral size of the slanted slots 10 smaller than the lateral size of the core 12 in the coupling region 30, the need for forming very narrow slots (narrower than 100 nm in the propagation direction x, needed for transmission reasons) as required in prior art slanted couplers can be avoided. In embodiments of the present invention, radiation 20 incident from the waveguide 13 on a slanted slot 10 of the slanted segmented coupler is partly reflected upwards at the interface with air. Part of the radiation 20 coming from the waveguide 13 and incident on the slanted segmented coupler is transmitted in between or around the slanted slots 10 and propagates further through the waveguide until it reaches another slot 10, where it may be reflected. As opposed to prior art slanted grating couplers, where very narrow (e.g., less than 100 nm wide) slots are required to allow tunneling of radiation through the slots, in embodiments of the present invention part of the radiation is transmitted in between the slots 10, such that the need for tunneling through the slots can be avoided and the slots may be wider (in the propagation direction x of the waveguide) than in prior art solutions.

In embodiments according to the present invention, the size of the slanted slots in the propagation direction of the waveguide may be larger than 250 nm, preferably larger than 300 nm. The sidewalls of the slots of the grating may form an angle of between 30 and 60 degrees with the plane of the waveguide. They may, for example, form an angle of about 45 degrees with the plane of the waveguide. Also, other angles are possible.

Figure 4:
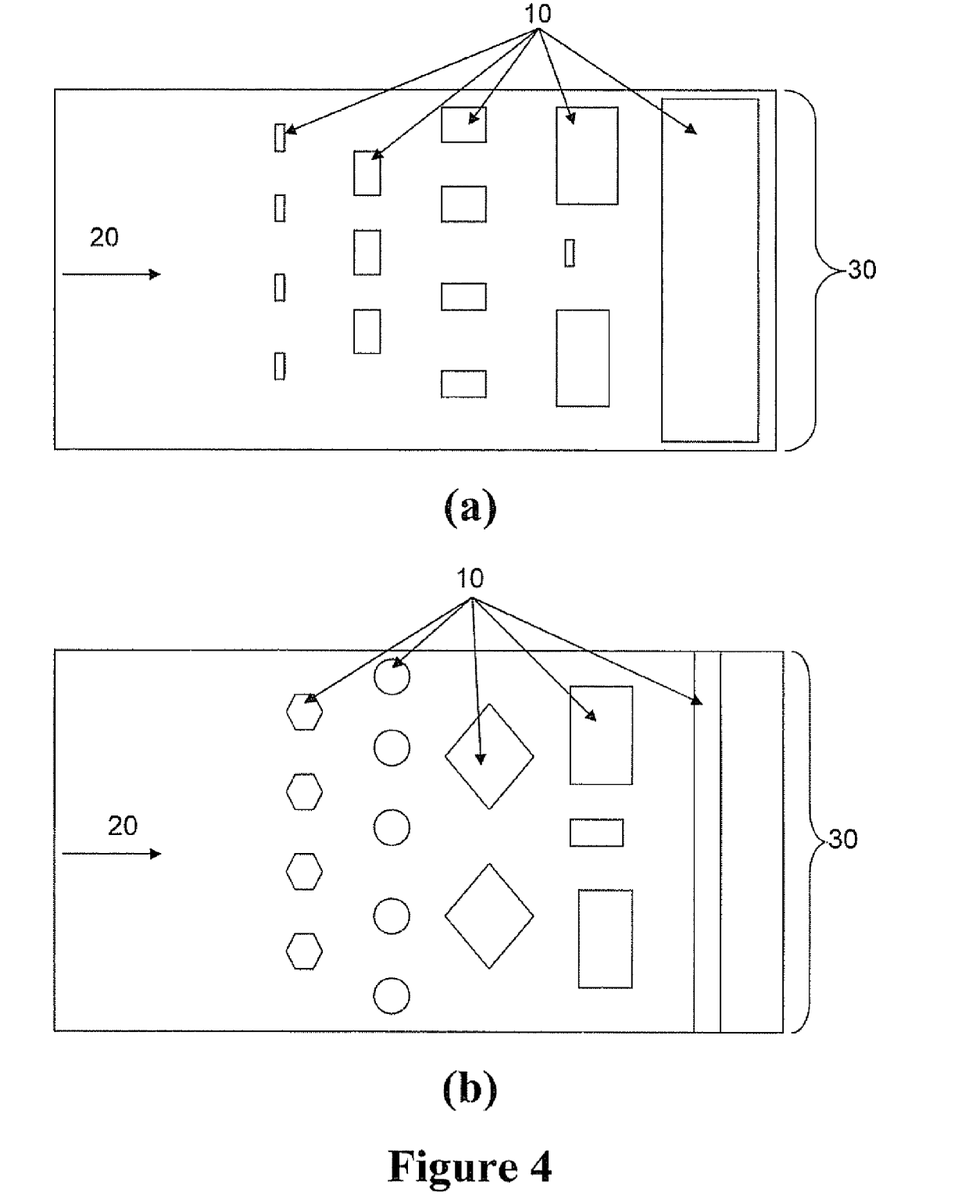
FIG. 4 shows a top view of slanted segmented couplers according to embodiments of the present invention, illustrating slanted slots with different sizes (FIG. 4a) and different shapes (FIG. 4b).

The slanted slots can vary in width, length, and shape. The cross-sectional shape of the plurality of slanted slots 10 in a plane parallel to the waveguide plane may be for example a rectangular shape, a square shape, a circular shape, or an oval shape. Other shapes are possible. Different sizes and/or shapes can be combined within one grating coupler, as shown in FIG. 4.

Figure 5:
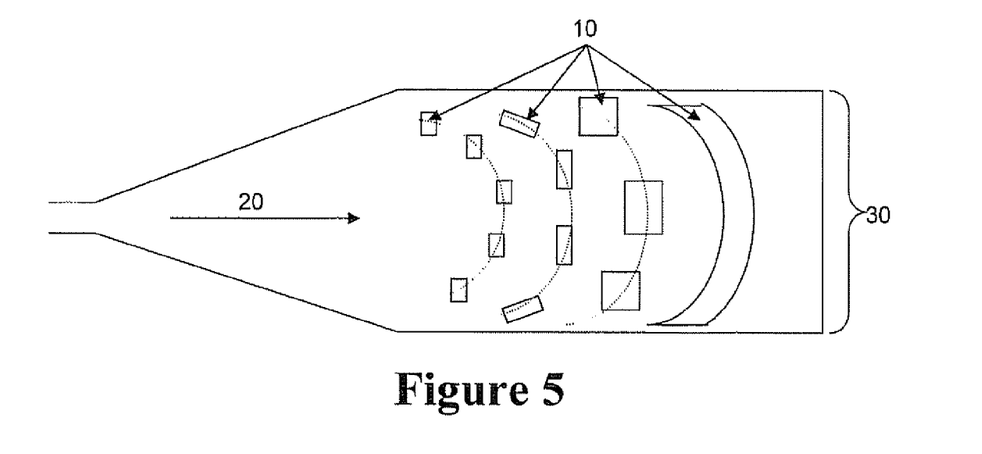
FIG. 5 shows a top view of a slanted segmented coupler according to embodiments of the present invention, illustrating an arrangement of the slanted slots on curved lines.

The slanted slots 10 may be located along essentially parallel lines, perpendicular to the propagation direction x of the light beam 20 (as shown in FIG. 3). The parallel lines may be straight lines. In an alternative embodiment, the slanted slots 10 may be located along curved, e.g., confocal, lines, for example circular lines or elliptical lines, with a common focal point, for focusing the radiation beam. This is illustrated in FIG. 5.

Slanted slots 10 on one line can be located such that all light coming from a radiation beam 20 propagating in the waveguide 13 passes to several of these slanted slots 10. In case a uniform output beam is required, different parts of the radiation beam 20 should pass a more or less equal number of slanted slots 10. In embodiments of the present invention, the slots 10 may be arranged such that within two neighboring lines there are no slots at the same location in the lateral direction y. The lateral displacement of the slanted slots 10 may be such that the slanted slots on one line are alternating with the slanted slots on the neighboring lines.

After the light encounters a slanted wall, it is partly reflected upwards, so looking further in the propagation direction x, there will be little or no light remaining after this. So there is not much use in putting a slanted slot there. Further away, there can be another slot 10 on that same lateral position, since another part of the light, which has traveled around the slots 10, can reach this slot. Other configurations, with non-parallel lines, may be possible. The slanted slots 10 may also be arranged in a more random way.

The core 12 of the waveguide 13 may comprise a first material having a first refractive index and the upper cladding 11 may comprise a second material having a second refractive index, the refractive index of the core 12 being larger than the refractive index of the cladding 11. The refractive index of the core 12 may be larger than the refractive index of the substrate 14. In embodiments of the present invention, the substrate 14 may comprise a plurality of layers, such as for example a lower cladding layer adjacent to the core 12 of the waveguide 13, the lower cladding layer having a lower refractive index than the core 12.

The waveguide 13 may be for example a slab waveguide, a strip loaded waveguide, a channel waveguide, or a ridge waveguide.

In embodiments according to the present invention, the slanted segmented coupler may for example be implemented in a low index contrast material system, for example an InP/InGaAsP heterostructure wherein the waveguide 13 may comprise an InGaAsP core 12 and an InP cladding 11 on an InP substrate 14.

In a preferred embodiment, the waveguide core 12 may be for example an InGaAsP layer with a thickness in the range between 200 nm and 700 nm, possibly including gain layers. The upper cladding layer 11 may be for example an InP layer with a thickness in the range between 100 nm and 1 micrometer. The width of the coupling region 30, i.e., the region where the slanted slots 10 are located, may for example be in the range between 4 and 20 μm.

A top antireflection coating may be provided to avoid radiation back into the waveguide. In other embodiments according to the present invention, the slanted segmented coupler may be implemented in other material systems, such as for example a material system based on GaAs, $SiO_2$, $Si_3N_4$, or others.

The slanted segmented grating coupler according to embodiments of the present invention may be used for coupling in the coupling region 30 a radiation beam 20 between a waveguide 13 and an optical element that is oriented out of the plane of the waveguide. The optical element may be oriented substantially perpendicular to the waveguide plane or it may be oriented at an angle with respect to the orthogonal to the waveguide plane, for example at an angle of less than 30°, for example an angle between 8° and 12°. The slanted segmented grating coupler can be used both for coupling a radiation beam 20 from a waveguide 13 to an optical element and for coupling a radiation beam 20 from an optical element to a waveguide 13, e.g., a waveguide on a photonic circuit. The optical element may comprise for example an optical fiber, a waveguide, a photonic waveguide circuit, a photodetector, or a light source such as, e.g., a light emitting diode or a laser.

The location, the size, and the shape of the slanted slots 10 can be arranged so as to optimize the coupling efficiency to the optical element, e.g., an optical fiber. The coupling efficiency is defined as the fraction of the optical power in the optical element that is coupled into the waveguide. By reciprocity, this is also the fraction of power that can be coupled from the waveguide into the optical element.

The plurality of slanted slots 10 may have predefined locations, sizes, and shapes for maximizing the coupling efficiency. The location, size and shape of the slots 10 may be selected such that the light is coupled out in a distributed way. The cross-sectional shape of the slanted slots 10 in a plane parallel to the plane of the waveguide, their size and location can be arranged such that the intensity profile of a radiation beam 20 coupled by the slanted segmented grating coupler from the waveguide 13 to a fiber matches the fiber mode as close as possible. This can be achieved by varying the size and/or spacing of the slots in both the x (propagation) and y (lateral) direction. For example, a Gaussian or Gaussian-like intensity profile may be imposed on a radiation beam 20 coupled by the grating coupler form the waveguide 13 to the optical element, e.g., optical fiber.

Figure 6:
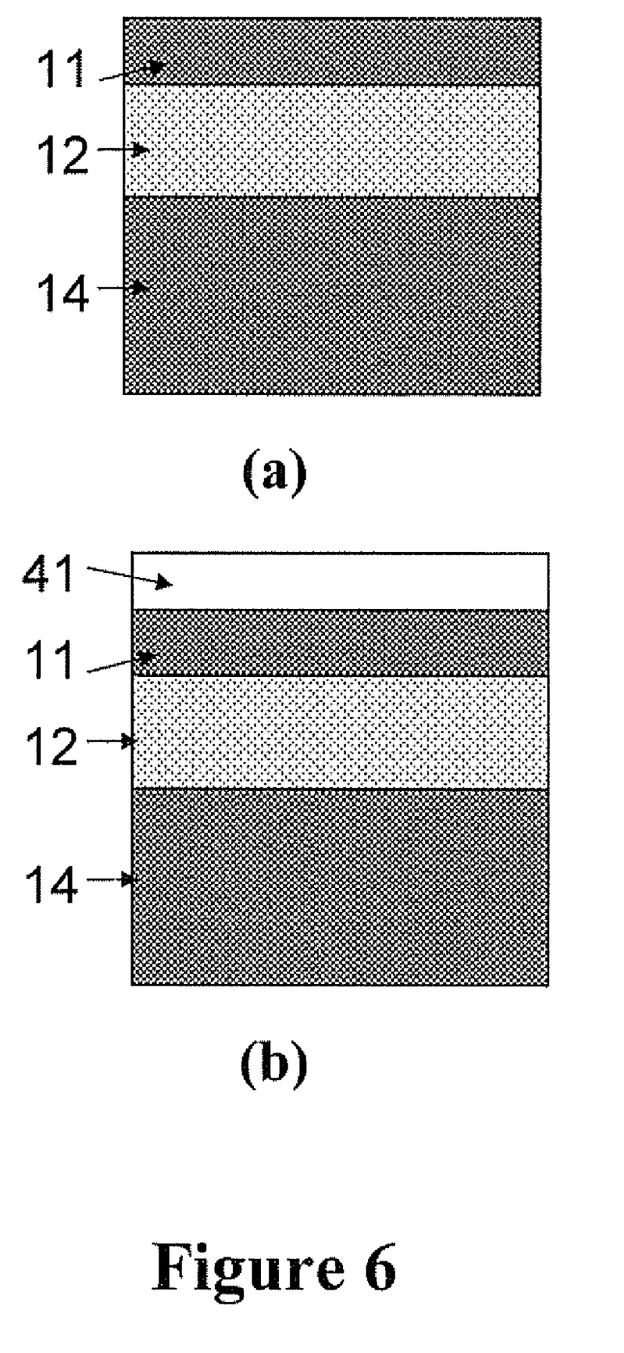
FIG. 6 illustrates a fabrication scheme of a slanted segmented grating coupler according to embodiments of the present invention, wherein the slots are etched by means of, e.g., angled CAIBE, using a hardmask.

Different fabrication techniques may be used for creating the slanted slots. One embodiment is described hereafter in detail and is illustrated in FIG. 6. On a substrate 14 comprising a waveguide core 12 and an upper cladding layer 11 (FIG. 6a), a hardmask 41 is deposited (FIG. 6b), followed by a resist layer 42 (FIG. 6c). The substrate 14 may for example comprise InP, GaAs or Si. Materials that may be used for forming the hardmask 41 are for example polymers, SiO2, Si3N4 or metals. The hardmask 41 should resist to the chemistry used for etching the slanted slots 10, as described further.

A pattern comprising a plurality of openings for defining the slots 10 is then created in the resist layer 42 by lithographic techniques (FIG. 6d). The pattern is such that the plurality of openings does not span the full lateral width of the waveguide core 12 in at least part of the coupling region 30, the lateral width of the core being the size of the core in the waveguide plane and in a direction perpendicular to the propagation direction of the waveguide.

As shown in FIG. 6e, this pattern is then transferred to the hardmask 41 by removing the hardmask where the openings are located, using the patterned resist layer as a mask. Removing the hardmask may be performed with etching techniques, such as for example Reactive Ion Etching. In embodiments of the present invention, etching of the hardmask 41 may be performed such that the sidewalls of the resulting hardmask profile are substantially orthogonal to the plane of the waveguide. In an alternative embodiment, the sidewalls may be slanted, i.e., they may form an angle substantially different from 90 degrees with the plane of the waveguide, e.g., an angle in the range between 30 and 60 degrees, for example about 45 degrees.

The pattern comprising the plurality of openings is located in the coupling region 30. After removing the resist 42, slanted slots 10 are etched through the upper cladding 11, through the waveguide core 12, and in the substrate 14, thereby using the patterned hardmask as an etching mask (FIG. 6f). In case of angled etching, slanted slots 10 are formed, i.e., the sidewalls of the slots 10 form a first predefined angle with the waveguide plane. In embodiments of the present invention, this first predefined angle may be in the range between 30 an 60 degrees, for example the angle may be about 45 degrees. The slanted slots 10 may be etched fully through the planar waveguide 13, i.e., completely through the core 12 of the waveguide, which is typically 1 micron thick or even thicker.

It is an advantage of the present invention that there is no need for a good control of the etch depth, as long as etching is sufficiently deep, i.e., completely through the waveguide core 12. In embodiments according to the present invention, the size of the slots 10 in the propagation direction of the waveguide 13 may be larger than 250 nm, preferably larger than 300 nm. For these slots, etching requirements are less severe than in the case of, e.g., 100 nm wide slots, and sufficient etch depth can be achieved, e.g., an etch depth larger than 1 µm, the etch depth being measured in a direction orthogonal to the plane of the waveguide. Deep etching can be achieved by adequately choosing the shapes and dimensions of the openings in the hardmask and by making the hardmask 41 sufficiently thick such that the slots 10 can be etched completely through the core 12 of the waveguide 13 without fully consuming the hardmask 41 in between the openings during etching.

Etching the slanted slots 10 through the waveguide core 12 may for example be done by means of CAIBE (Chemically Assisted Ion Beam Etching). Angled slots may be obtained by mounting the substrate at an angle. Other etching methods can be used, such as for example Ion Beam Etching (IBE), Reactive Ion Beam Etching (RIBE), or Reactive Ion Etching (RIE).

In embodiments according to the present invention the slanted slots 10 may be etched directly (i.e., without using a hardmask) through the waveguide core 12 by means of Focuses Ion Beam Etching. However, in order to reduce optical losses, also in this case a hardmask, for example an alumina hardmask, may be used.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. A slanted grating coupler for coupling in a coupling region a radiation beam between a core of a waveguide lying substantially in a plane on a substrate and an optical element outside the plane, the grating coupler comprising:

a plurality of slanted slots that extend through the core, have sidewalls forming a first predefined angle with the waveguide plane, and are at least partially arranged successively in a propagation direction of the waveguide for coupling the radiation beam in a distributed way, wherein a size of the plurality of slanted slots in a lateral direction in at least part of the coupling region is smaller than a size of the waveguide core in the lateral direction, wherein the lateral direction is a direction within the plane and perpendicular to a propagation direction of the waveguide, and wherein successive slots are displaced with respect to each other in the lateral direction.

2. The slanted grating coupler according to claim 1, wherein the plurality of slanted slots have predetermined locations, sizes, and shapes for substantially matching an intensity profile of a radiation beam propagating in the waveguide to a fiber mode of an optical fiber to which the radiation beam is coupled by the grating coupler.

3. The slanted grating coupler according to claim 1, wherein the plurality of slanted slots have predetermined locations, sizes, and shapes for imposing a Gaussian-like intensity profile on a radiation beam coupled by the grating coupler from the waveguide to the optical element.

4. The slanted grating coupler according to claim 1, wherein the waveguide is selected from the group consisting of a slab waveguide, a strip loaded waveguide, a channel waveguide, and a ridge waveguide.

5. The slanted grating coupler according to claim 1, wherein a cross-sectional shape of the plurality of slots in a plane parallel to the waveguide plane is selected from the group consisting of lines, rectangles, squares, triangles, circles, and ovals.

6. The slanted grating coupler according to claim 1, wherein the plurality of slanted slots are arranged in substantially parallel lines and substantially perpendicular to the propagation direction of the waveguide.

7. The slanted grating coupler according to claim 1, wherein the plurality of slanted slots is arranged on curved lines with a common focal point.

8. The slanted grating coupler according to claim 1, wherein the lateral displacement of the slanted slots is such that the slanted slots on one line are alternating with the slanted slots on neighboring lines.

9. The slanted grating coupler according to claim 1, wherein the first predefined angle is in between 30 and 60 degrees.

10. The slanted grating coupler according to claim 1, wherein the first predefined angle is about 45 degrees.

11. A method for manufacturing in a coupling region a slanted grating coupler for coupling a radiation beam between a core of a waveguide lying substantially in a plane on a substrate and an optical element outside the plane, the method comprising:
   etching in the coupling region a plurality of slanted slots that extend through the core, have sidewalls forming a first predefined angle with the waveguide plane, and are at least partially arranged successively in a propagation direction of the waveguide for coupling the radiation beam in a distributed way,
   wherein a size of the plurality of slots in a lateral direction in at least part of the coupling region is smaller than a size of the waveguide core in the lateral direction,
   wherein the lateral direction is a direction within the plane and perpendicular to a propagation direction of the waveguide, and
   wherein successive slots are displaced with respect to each other in the lateral direction.

12. The method according to claim 11, wherein the plurality of slanted slots are arranged in substantially parallel lines and substantially perpendicular to the propagation direction of the waveguide.

13. The method according claim 11, wherein the plurality of slanted slots are arranged on curved lines with a common focal point.

14. The method according to claim 11, wherein the lateral displacement of the plurality of slanted slots is such that the slanted slots on one line are alternating with the slanted slots on neighboring lines.

15. The method according claim 11, wherein the first predefined angle is between 30 and 60 degrees.

16. The method according to claim 11, wherein the first predefined angle is about 45 degrees.

17. The method according to claim 11, further comprising:
   depositing a hardmask on the substrate comprising the waveguide;
   providing a resist layer on the hard mask;
   defining in the resist layer a pattern comprising a plurality of openings, the plurality of openings being located in the coupling region, at least part of the plurality of openings being arranged successively in the propagation direction of the waveguide, wherein in at least part of the coupling region a size of the plurality of openings in the lateral direction is smaller than a size of the coupling region in the lateral direction, and wherein successive openings are displaced with respect to each other in the lateral direction;
   removing the hardmask where the plurality of openings are located; removing the resist layer; and
   after etching the plurality of slanted slots, removing the hard mask.

18. The method according to claim 17, wherein dimensions of the openings and thickness of the hard mask are selected such that after etching the plurality of slanted slots through the core of the waveguide at least part of the hardmask remains in between the openings.

19. The method according to claim 17, wherein a cross-sectional shape of the plurality of openings in a plane parallel to the waveguide plane is selected from the group consisting of lines, rectangles, squares, triangles, circles, and ovals.

20. The method according to claim 17, wherein etching the hardmask is performed at a second predefined angle with respect to the waveguide plane.

21. The method according to claim 20, wherein the second predefined angle is between 30 and 60 degrees.

22. The method according to claim 20, wherein the second predefined angle is about 45 degrees.

* * * * *